US010671278B2

(12) United States Patent
Manjarrez et al.

(10) Patent No.: US 10,671,278 B2
(45) Date of Patent: Jun. 2, 2020

(54) ENHANCED VIRTUAL INSTRUMENT TECHNIQUES

(71) Applicant: Apple Inc., Cupertino, CA (US)

(72) Inventors: Eli T. Manjarrez, Sunnyvale, CA (US); Daniel P. Patterson, San Jose, CA (US); Christopher C. Lane, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 15/897,051

(22) Filed: Feb. 14, 2018

(65) Prior Publication Data

US 2019/0129611 A1 May 2, 2019

Related U.S. Application Data

(60) Provisional application No. 62/580,938, filed on Nov. 2, 2017.

(51) Int. Cl.
*G06F 3/0488* (2013.01)
*G10H 1/34* (2006.01)
*G10H 1/055* (2006.01)
*G10H 1/00* (2006.01)

(52) U.S. Cl.
CPC ....... *G06F 3/04886* (2013.01); *G10H 1/0008* (2013.01); *G10H 1/055* (2013.01); *G10H 1/342* (2013.01); *G06F 2203/04808* (2013.01); *G10H 2220/096* (2013.01); *G10H 2220/126* (2013.01); *G10H 2220/201* (2013.01); *G10H 2220/241* (2013.01); *G10H 2230/015* (2013.01); *G10H 2230/075* (2013.01)

(58) Field of Classification Search
CPC ...... G06F 3/04886; G06F 2203/04808; G10H 1/342; G10H 1/055; G10H 2220/096; G10H 2230/015; G10H 2220/241; G10H 2230/075; G10H 2220/201
See application file for complete search history.

(56) References Cited

U.S. PATENT DOCUMENTS

| 4,794,838 | A  | * | 1/1989 | Corrigau, III | ........... G10H 1/24 338/69 |
| 6,143,972 | A  | * | 11/2000 | Ladyjonsky | ........... G09B 15/04 84/470 R |
| 9,754,572 | B2 | * | 9/2017 | Salazar | .................. G10H 1/366 |
| 9,997,148 | B2 | * | 6/2018 | Cho | ........................ G10H 1/34 |

(Continued)

*Primary Examiner* — Grant Sitta
(74) *Attorney, Agent, or Firm* — Kilpatrick Townsend & Stockton LLP

(57) ABSTRACT

Embodiments of the present disclosure can provide systems, methods, and computer-readable medium for implementing user interfaces for interacting with a virtual instrument. For example, a user interface for a virtual instrument may be presented on a display of a device. The user interface may have any suitable number of strings (or keys) associated with a physical instrument. Each string/key may correspond to an associated audio file. Touch input may be received at the user interface. In some embodiments, the touch input may include a location corresponding to a particular string. The associated audio file may be selected based on the location. The associated audio file may be presented (e.g., via a speaker of the device) at a volume that corresponds with the pressure at which the touch input was provided.

19 Claims, 8 Drawing Sheets

(56) References Cited

U.S. PATENT DOCUMENTS

| | | | |
|---|---|---|---|
| 10,170,088 B2* | 1/2019 | Bell | G10H 1/0008 |
| 2007/0180978 A1* | 8/2007 | Ozaki | A63F 13/00 |
| | | | 84/602 |
| 2007/0221046 A1* | 9/2007 | Ozaki | A63F 13/00 |
| | | | 84/612 |
| 2008/0280680 A1* | 11/2008 | Dutilly | A63F 13/00 |
| | | | 463/36 |
| 2009/0312102 A1* | 12/2009 | Oberg | A63F 13/10 |
| | | | 463/37 |
| 2010/0137048 A1* | 6/2010 | Kim | G09B 15/003 |
| | | | 463/7 |
| 2010/0137049 A1* | 6/2010 | Epstein | A63F 13/10 |
| | | | 463/7 |
| 2010/0282044 A1* | 11/2010 | Delorme | G10H 1/342 |
| | | | 84/609 |
| 2011/0034247 A1* | 2/2011 | Masuda | G10H 1/342 |
| | | | 463/35 |
| 2011/0088535 A1* | 4/2011 | Zarimis | G10H 1/0066 |
| | | | 84/645 |
| 2011/0207513 A1* | 8/2011 | Cross | A63F 13/10 |
| | | | 463/7 |
| 2012/0007884 A1* | 1/2012 | Kim | G10H 1/24 |
| | | | 345/633 |
| 2012/0160079 A1* | 6/2012 | Little | G10H 1/38 |
| | | | 84/613 |
| 2014/0083279 A1* | 3/2014 | Little | G10H 1/386 |
| | | | 84/609 |
| 2016/0124559 A1* | 5/2016 | Linn | G10H 1/0066 |
| | | | 345/173 |
| 2016/0267893 A1* | 9/2016 | Bergman | G10H 1/342 |
| 2017/0047056 A1* | 2/2017 | Lee | G06F 9/451 |
| 2018/0082606 A1* | 3/2018 | Jones | G09B 15/023 |
| 2019/0129611 A1* | 5/2019 | Manjarrez | G10H 1/055 |

* cited by examiner

ENHANCED VIRTUAL INSTRUMENT TECHNIQUES

CROSS REFERENCES TO RELATED APPLICATIONS

The present application claims the benefit of U.S. Provisional Application No. 62/580,938, filed Nov. 2, 2017, which is hereby incorporated by reference for all purposes.

BACKGROUND

Virtual musical instruments, such as musical instrument digital interface (MIDI)-based or software-based keyboards, string instruments, and the like, typically have user interfaces that attempt to closely resemble the actual instrument. When a user selects an element of the user interface, the virtual musical instrument attempts to play a note. While these instruments are enjoyable to amateur and experienced musicians alike, stylistic features and/or playing techniques may be difficult or impossible for a device to emulate with conventional user interfaces. This can be problematic for users who would like to include such stylistic features and/or techniques as they play.

SUMMARY

Embodiments of the present disclosure can provide systems, methods, and computer-readable medium for implementing enhanced virtual instrument techniques. In some examples, a computing device (e.g., a mobile phone, a tablet, or other portable, handheld device) may be used to present enhanced user interfaces and/or user interface elements to provide the user with the ability to more accurately simulate stylistic features (e.g., volume changes) and/or certain playing techniques based on one or more inputs made at the display of the device.

In some embodiments, a computer-implemented method for providing enhanced virtual instrument techniques for providing audio output. The method may comprise obtaining a plurality of audio samples corresponding to recordings of musical notes played by a physical instrument. The method may further comprise displaying, on a display screen of an electronic device, a user interface for a virtual instrument associated with the physical instrument. In some embodiments, the user interface may include a selection area having a plurality of user interface objects corresponding to a plurality of strings, each of the plurality of strings having an associated position. The method may further comprise detecting, on the display screen, a first location and first amount of pressure of a touch input. In some embodiments, the first location of the touch input may indicate a first associated string position of a plurality of string positions within the selection area. The method may further comprise presenting, via a speaker of the electronic device, a first audio sample of the plurality of audio samples. In some embodiments, the first audio sample may include a first musical note corresponding to the first associated string position, the first audio sample may be presented at a first volume corresponding to the first amount of pressure. The method may further comprise detecting (while the touch input is maintained), on the display screen, a second location and a second amount of pressure of the touch input. In some embodiments, the second location may indicate a second associated string position within the selection area. The method may further comprise presenting, via the speaker of the electronic device, a second audio sample of the plurality of audio samples. The second audio sample may include a second musical note corresponding to the second associated string position. The second audio sample may be presented at a second volume corresponding to the detected second amount of pressure of the touch input.

In some embodiments, a computing device may be provided. The computing device may include a memory configured to store computer-executable instructions, a display, a speaker, and a processor in communication with the memory, the display, and the speaker. The processor may be configured to execute the computer-executable instructions. Executing the instructions may cause the device to display, on the display, a user interface for a virtual instrument associated with the physical instrument. The user interface may include a selection area having a plurality of user interface objects corresponding to a plurality of strings, each of the plurality of strings having an associated position. Executing the instructions may cause the device to detect a first location and first amount of pressure of a touch input provided at the user interface. The first location of the touch input may indicate a first associated string position of a plurality of string positions within the selection area. Executing the instructions may cause the device to present, via the speaker, a first audio sample including a first musical note corresponding to the first associated string position. The first audio sample may be presented at a first volume corresponding to the first amount of pressure. Executing the instructions may cause the device to detect, while the touch input is maintained, a second location and a second amount of pressure of the touch input. The second location may indicate a second associated string position within the selection area. Executing the instructions may cause the device to present, via the speaker, a second audio sample. The second audio sample may include a second musical note corresponding to the second associated string position. The second audio sample being presented at a second volume corresponding to the detected second amount of pressure of the touch input.

In some embodiments, a computer-readable medium may be provided. The computer-readable medium may store thereon computer-executable instructions that, when executed by a processor, cause the processor to perform operations. The operations may comprise displaying, at a display, a user interface for a virtual instrument associated with the physical instrument, the user interface including a selection area having a plurality of user interface objects corresponding to a plurality of strings, each of the plurality of strings having an associated position. The operations may further comprise detecting a first location and first amount of pressure of a touch input provided at the user interface, the first location of the touch input indicating a first associated string position of a plurality of string positions within the user interface selection area. The operations may further comprise presenting, via a speaker, a first audio sample including a first musical note corresponding to the first associated string position, the first audio sample being presented at a first volume corresponding to the first amount of pressure. The operations may further comprise maintaining the first volume of the first audio sample while touch input updates to the touch input are detected, the touch input updates including updated locations associated with the first associated string position. The operations may further comprise detecting, at the user interface, a touch input update corresponding to a second location and a second amount of pressure, the second location indicating a second associated string position within the selection area.

The following detailed description together with the accompanying drawings will provide a better understanding of the nature and advantages of the present disclosure.

DETAILED DESCRIPTION

Figure 1:
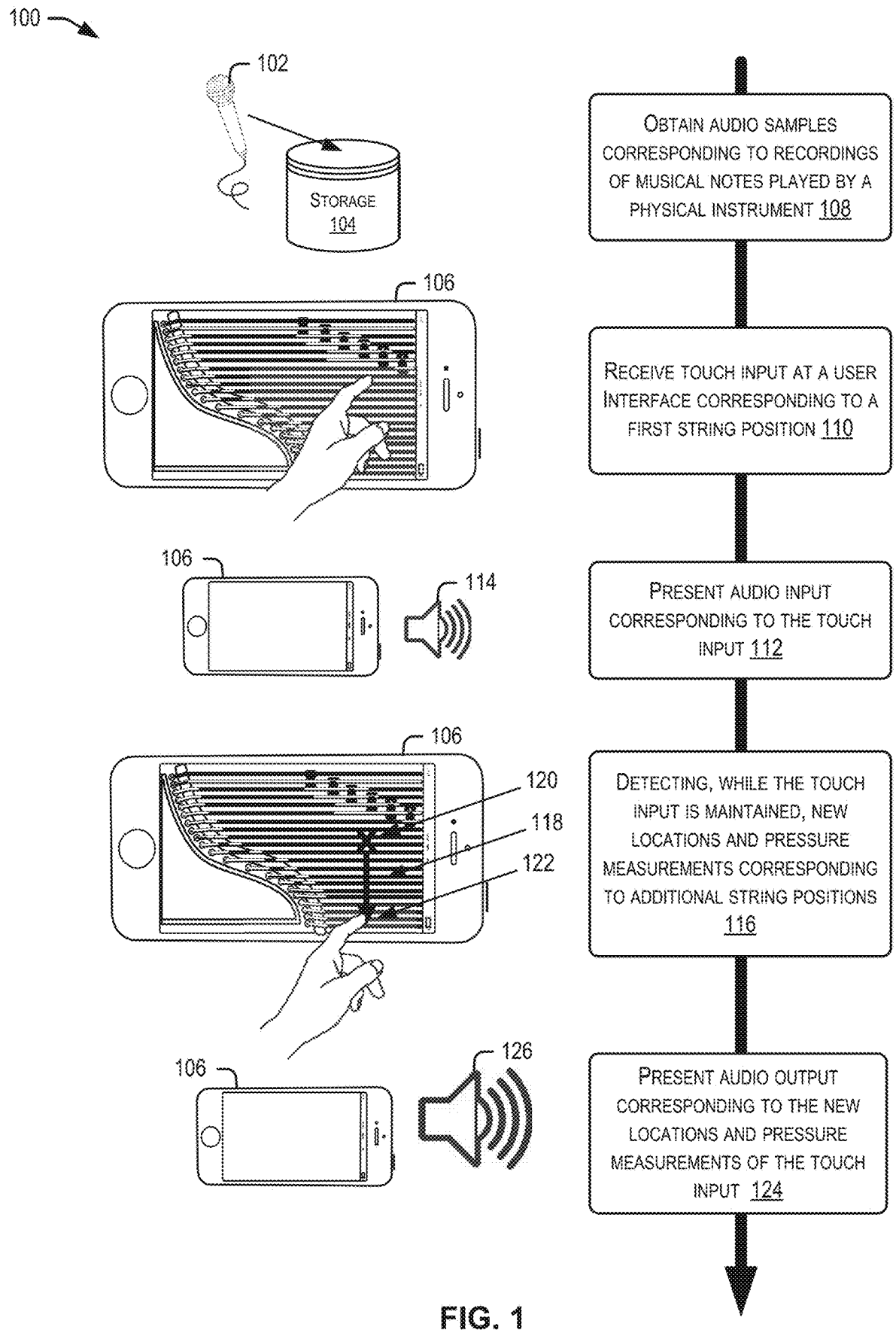
FIG. 1 is a simplified block diagram illustrating an example flow for providing audio output for a virtual instrument (e.g., a Guzheng) as described herein, according to at least one example.

Certain embodiments of the present disclosure relate to devices, computer-readable medium, user interfaces, and methods for implementing user interfaces and user interface elements for interacting with a virtual instrument. Examples are described with reference to virtual instruments, and user interfaces of the virtual instruments for playing notes and/or music (e.g., electronic audio files) with the virtual instruments. The virtual instruments may be generally designed to give the look and feel of an actual instrument, and may be intended to sound like the actual instrument. Virtual instruments can be designed to mimic nearly any musical instrument, with examples including, but not limited to, string instruments, brass/horns, woodwinds, various keyboards, and the like. Although examples herein may utilize particular stringed instruments, the same examples may be similarly applied to other types of musical instruments. Thus, any reference to a "string" may similarly be applied to a "key" of another type of instrument. A computing device (e.g., a mobile phone, tablet, or other portable, handheld device, or a desktop computer, laptop, etc.) may be configured to present various user interfaces and corresponding user interface elements that enable enhanced user input capabilities.

In some embodiments, the user may desire to play the instrument with particular stylistic features or a particular playing technique. By way of example, the user may wish to simulate a glissando effect. A "glissando effect" is intended to refer to a playing technique which simulates a continuous slide upward or downward along strings or keys of a physical instrument. As another example, the user may wish to play several notes corresponding to different strings/keys in quick succession. As a glissando (or several notes) are played on the physical instrument, the individual notes are played at a volume that is responsive to the amount of pressure the player provides as the string/key is played. Embodiments of the invention are directed to simulate the playing technique by varying the volume of the audio output provided according to pressure measurements of the input.

In at least one embodiment, the computing device may provide a user interface that may include a visual representation of a variety of strings that correspond to notes that may be sounded by the actual instrument. As a non-limiting example, the computing device may be configured to present a user interface that closely resembles a stringed (or non-stringed) instrument. The user interface may be presented on a display of the computing device to enable the user to select (e.g., via touch input or otherwise) one or more strings for which audio output is presented (e.g., via a speaker of the device).

In at least one embodiment, the user may access the user interface and select a string/key to play. When the user selects the string/key at the display screen, a location and an amount of pressure (e.g., a pressure measurement) of the input may be detected. An audio output corresponding to the location may be determined by the computing device. The computing device may further determine a volume for providing the audio output based on the amount of pressure with which the input was provided. The audio output (e.g., a musical note) may be provided via a speaker of the computing device according to the location and the pressure detection. Thus, a harder touch may result in musical note being sounded at a higher volume then a musical note resulting from a lighter touch.

Once the user has selected the string, she may, while maintaining contact, drag her finger upward or downward along the user interface. The computing device may determine that the contact has been maintained based at least in part on a detection of the finger contact continuously being detected. If, at any time, the finger contact is not detected, the system may determine that the contact has not been maintained. Accordingly, as the user's actions provide input indicating another string, the computing device may detect the new string selection and obtain a new pressure measurement at the location of the new selection. The pressure measurement may be utilized to determine a corresponding volume for the selection and an audio output (e.g., a musical note) may be provided via a speaker of the computing device accordingly. Thus, as the user drags her finger upward or downward along the user interface, various musical notes may sound as she passes each string/key. The volume of these musical notes may vary according to the pressure she provided as each string/key was selected. As a non-limiting example, the user may select a string and drag her finger along a downward path, increasing the pressure on the display somewhat continuously as she drags. In response, the musical notes corresponding to the strings selected/traversed along the path will increase in volume through the action.

It should be appreciated that in some embodiments, pressure measurements may be obtained from touch input at regular intervals, or as the pressure changes at the display. This may provide a large quantity of pressure updates that do not necessarily correspond to a new string selection. In conventional systems, a large portion (or all) of these pressure measurements may result in excess processing as pressure updates are triggered. These pressure updates might not necessarily result in a change in audio output. To reduce processing efforts, some embodiments may provide that pressure updates merely update a global variable to maintain knowledge of a current measurement without further processing the input.

By utilizing the techniques described here, the computing device may more realistically simulate various stylistic features or playing techniques of the instrument. Additionally, or alternatively, the computing device may operate in a more efficient manner by reducing unnecessarily processing of pressure measurement changes that will not result in a change to audio output provided by the computing device.

FIG. 1 is a simplified block diagram illustrating an example flow 100 for providing audio output for a virtual instrument (e.g., a Guzheng) as described herein, according to at least one example. A "Guzheng" is a traditional Chinese instrument that is 64 inches long and has a large, resonant cavity made from wood. The Guzheng may have 16 or more (e.g., 21) strings. The Guzheng may be utilized to provide various examples within this disclosure. However, it should be appreciated that the specific use of the Guzheng is merely intended for illustration. Any example discussed herein may equally be apply to other virtual instruments that represent a physical instrument, whether that be a stringed instrument or otherwise. Therefore, the examples herein may be equally applied to virtual instruments that simulate a Koto, a Harp, a Piano, a Guitar, a Pipa, an Erhu, or any suitable physical instrument.

In some embodiments, recording device 102 (e.g., a computing system with a microphone or the like) may be configured to record audio samples (e.g., note samples). The audio samples may be a recording of sound that is made when a string/note/key of physical instrument is affected in some way. For example, a user may strum, pluck, hammer, pull, draw with a bow, fingernail, or other item, etc., of the physical instrument to make the sound. Recording device 102 may be configured to record the note that was played by the string.

Once recorded, the samples may be stored within sample storage 104. Sample storage 104 can be any type of memory or storage device including, but not limited to, any type of non-volatile memory that can be used to store the isolated samples in a permanent or at least semi-permanent fashion. Sample storage 104 can be memory that is local to recording device 102, the computing system that includes recording device 102, or user device (e.g., a cellular telephone, tablet, laptop, or the like). As such, the samples may be stored at the user device as soon as they are created, or they may be need to be received by user device and stored locally for later use. In any event, the audio samples can be stored for replay when a user selects an appropriate user interface element, as will be described in further detail. The computing device 106 may be an example of a user device.

The flow may being at 108, where the audio samples corresponding to the recordings of musical notes played by the physical instrument may be obtained. As indicated above, the audio recordings may be obtained from storage 104 and/or from local storage of the computing device 106. In the example depicted in FIG. 1, the audio samples may be previous recordings of various musical notes as played by a Guzheng.

In some examples, a user may activate and/or utilize a user interface of user device 106 to play the virtual instrument. In one example, a virtual instrument may be presented by the user interface in such as a way as to represent at least the strings of a Guzheng. At 110, computing device 106 may receive touch input at the user interface of the virtual instrument via an application presented by computing device 106. The input may be an indication of two different things: the note that the user would like to play and the manner with which the user would like the note played. For example, the touch input may correspond to a string position identified based on a location of the touch input within the user interface. A note may be selected (e.g., from the audio samples obtained at 108) based on the identified string location. Additionally, the touch input received at 110 may correspond to a pressure measurement (e.g., an amount of pressure with which the touch input was provided). The pressure measurement may correspond to a volume at which the note may be sounded. In some embodiments, the touch input received at 110 may correspond to additional playing features such as an attack (e.g., an emphasis, stress, articulation, etc.) of the musical note.

At 112, audio output corresponding to the touch input received at 110 may be presented (e.g., by a speaker or other output device of computing device 106). As a non-limiting example, once a note is selected (e.g., accordingly to the location of the touch input received at 110), the volume and/or attack of the note may be determined based on a pressure measurement of the touch input. By way of example, a harder touch corresponding to a larger amount of pressure may be determined to correspond to a louder volume then a softer touch corresponding to a lesser amount of pressure. Audio output (e.g., a previously recorded audio sample of a musical note corresponding to the selected string location) may then be presented by a speaker of the computing device 106 at a volume 114 (or attach) that corresponds to the amount of pressure of the tough input.

At 116, while the touch input received at 110 is maintained, new locations and pressure measurements corresponding to additional string position may be detected. By way of example, the user may select a string and, while maintaining contact with the display screen, drag her finger across the user interface until she approaches/traverses another string. An example of this action is depicted at 118, where the user may initially select the location 120 (e.g., corresponding to a location associated with a first string position) and, while maintaining contact with the display screen, drag her finger along a path to the location 122 (e.g., corresponding to a location associated with a second string position). In the course of the dragging action along the path, the user's finger (or other touch input device such as a stylus) may pass a number of locations associated with the various strings of the virtual instrument. Upon approaching and/or traversing each of the locations corresponding to the various strings, new locations and/or pressure measurements may be detected.

At 124, audio output may be presented (e.g., via a speaker of the computing device 106) that corresponds to the new locations and pressure measurements detected at 116. Continuing with the example in which the user selects location 120 and drags her finger to location 122, as each new string is approached and/or traversed, the audio output may play the appropriate musical note (e.g., a previously recorded musical note) at a volume 126 that corresponds to the pressure measurement detected. Accordingly, if the user increases pressure relatively consistently as she drags her finger from location 120 to location 122, each musical note played at the speaker may likewise increase in volume.

In this manner, the audio output provided when playing the virtual instrument may more accurately simulate a stylistic feature or playing technique of the physical instrument.

Figure 2:
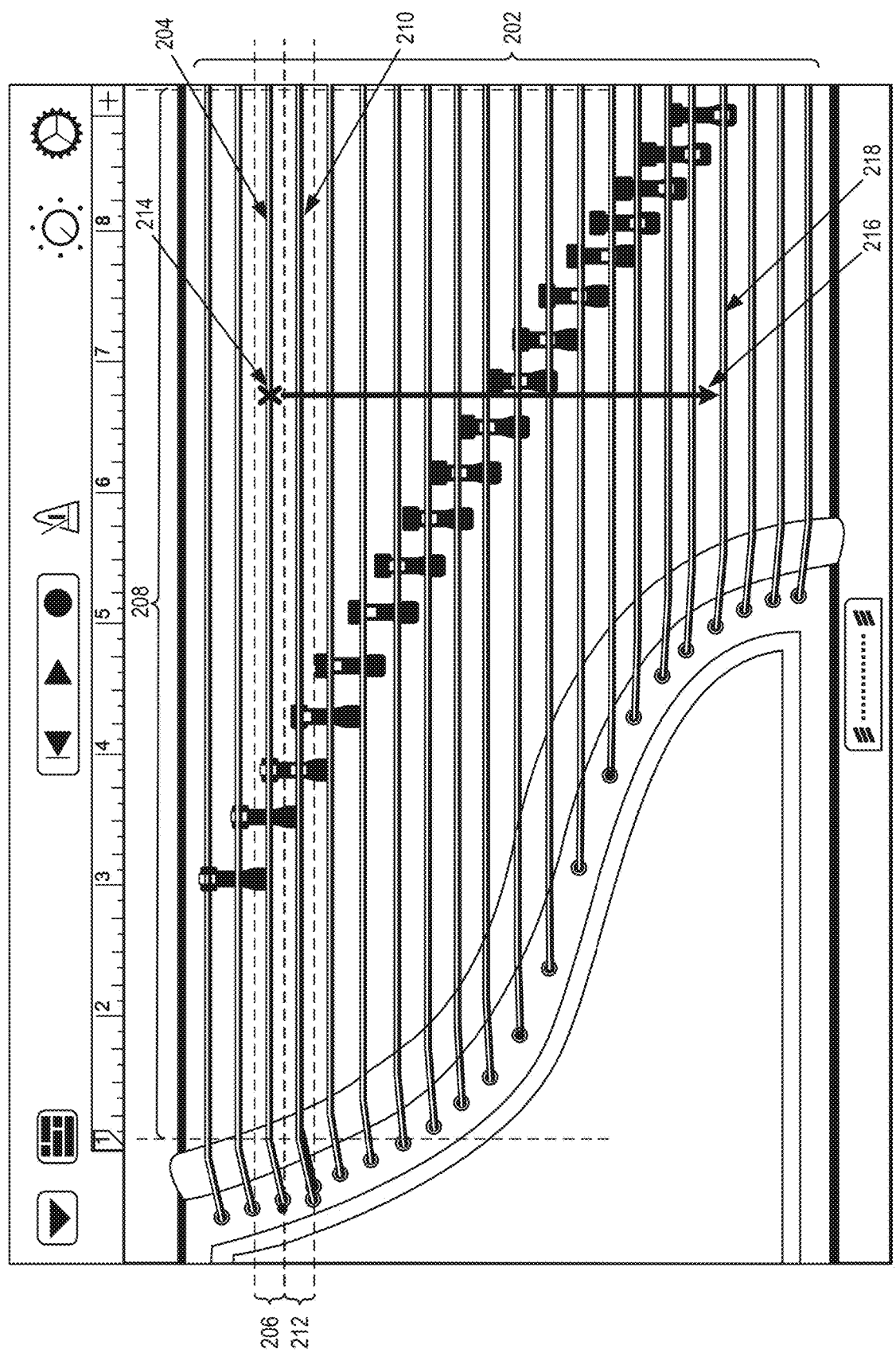
FIG. 2 is a simplified block diagram illustrating an example user interface for a virtual instrument (e.g., a Guzheng) that may be provided utilizing a computing device, according to at least one embodiment.

FIG. 2 is a simplified block diagram illustrating an example user interface 200 for a virtual instrument (e.g., a Guzheng) that may be provided utilizing a computing device (e.g., the computing device 106 of FIG. 1), according to at least one embodiment. The user interface 200 is intended to be illustrative in nature, and is not intended to limit the scope of the disclosure. Any suitable user interface that depicts strings/notes/keys of a physical instrument may equally be utilized.

In some examples, a user may activate and/or utilize the user interface 200 to play a virtual instrument. In one example, the user interface 200 may be configured in such as a way as to represent the strings of a physical instrument (e.g., a Guzheng). As a non-limiting example, the user interface 200 may include any suitable number (e.g., 21) of strings 202 corresponding to strings of the physical instrument (e.g., a Guzheng). Input (e.g., touch input) may be received at the strings 202 via the user interface 200. The input may be an indication of two different things: the note that the user would like to play (e.g., identified based at least in part on a location of the input at the user interface) and the manner with which the user would like the note played (e.g., an attack, a volume, etc.).

In some embodiments, the string 204 may be associated with an area that is used to pictorially represent the string 204 and/or the string 204 may be associated with an area surrounding the representation of the string 204. By way of example, an area associated with the string 204 may be defined as including locations within a threshold distance of the string 204. To illustrate, the locations within the boundaries indicated at 206 may also be associated with the string 204, as well as the locations along the string 204 that fall, for example, between the boundaries depicted at 208. Accordingly, touch input received at any location within this area may be determined to correspond to a musical note associated with the string 204. Similarly, the string 210 may be associated with any locations that fall between the boundaries depicted at 212 and 208, as well as location along the string 210 itself.

In some embodiments, pressure measurements corresponding to an amount of pressure may be detected in regular intervals or as touch input locations change. Thus, it is possible that multiple pressure measurements may be received as the user's touch input fluctuates between locations/areas corresponding to different strings as well as locations within an area corresponding to a single string (e.g., within the boundaries depicted at 206 and 208).

In some embodiments, the user may provide touch input a location (e.g., the location 214) which may correspond to a string (e.g., the string 204). That is, the user may touch the display screen at a location 214 that corresponds to the string 204. The touch input may include the location 214 and a pressure measurement corresponding to an amount of pressure with which the touch input was provided, or the location 214 and/or pressure measurement may otherwise be obtained. The computing device may identify an audio sample (e.g., of a previously recorded musical note) that is associated with the location 204. Alternatively, the computing device may determine that the location 204 falls within the area defined by the boundaries depicted at 206 and 208, and identify the audio sample based on that determination.

The identified audio sample may be modified according to the amount of pressure utilized to provide the touch input and provided at a speaker of the computing device 106. By way of example, the previously recorded audio sample may have been played at a particular volume. The recorded volume may be associated with a particular amount of pressure. If the amount of pressure utilized to provide the touch input is the same as the amount of pressure associated with the recorded volume, then the audio output may be provided unaltered with respect to the volume. It is possible that the amount of pressure used to provide the touch input is different than the amount of pressure associated with the recorded volume. In this case, the audio output may be modified in such a way as to provide the musical note at a volume corresponding to the amount of pressure utilized to provide the touch input. Thus, the audio input provided in response to the selection of the location 214 may be provided at a louder or softer volume than recorded, depending on how much force the user provided when making the selection.

In some embodiments, while maintaining contact (e.g., over a threshold amount of time) with the display after providing touch input corresponding to the location 214, the user may drag her finger (or other touch input device) to the location 216 corresponding to the string 218. As she executes the dragging action, pressure measurements may be received/obtained. In some embodiments, toward the beginning of the dragging action, pressure measurements may be received/obtained that correspond to the string 204. That is multiple pressure measurements may be received within the boundaries depicted at 206 and that correspond to the string 204. In some embodiments, a pressure measurement corresponding to the initial touch input may be utilized to provide the audio output as described above. Subsequent pressure measurements corresponding to the string 204 (along the string or within the boundaries depicted at 206) and/or locations that do not indicate a change to the musical note selected, may be ignored entirely or may be utilized for limited purposes. By way of example, a new pressure measurement corresponding to a musical note that has already been identified (e.g., based on the touch input corresponding to the location 214) may be utilized to update a current pressure measurement, but processing discussed herein directed to determining an audio sample and/or adjusting volume of an audio sample may not be executed.

As the user drags her finger downward, the touch input may traverse into the area defined by the boundaries depicted at 212 and corresponding to the string 210. Upon receiving a touch input that indicates a change in the musical note (e.g., the first touch input that falls within the boundaries depicted at 212), the process for identified/selecting an audio sample and/or determining a volume at which to provide the audio sample may be executed once more. This process may be repeated any suitable number of times as the user's touch input enters into an area associated with a newly selected string. By way of example, the process in which an audio sample is selected based on input location and a volume determined for the audio sample based on a pressure measurement corresponding to the input location may be performed 16 times as the user drags her finger from the location 214 corresponding to the string 204, the location 216 corresponding to the string 218.

Accordingly, the audio output provided at the speaker of the computing device 106 may vary according to hard or soft the user presses as she executes the dragging action. It should be appreciated, that although the dragging action is depicted in the downward direction, any motion, in any suitable direction may be utilized to adjust the volume of audio output in a similar manner as described above. In some embodiments, the volume adjustments may be triggered so long as contact has been maintained over a threshold time period, and for as long as contact is maintained.

Figure 3:
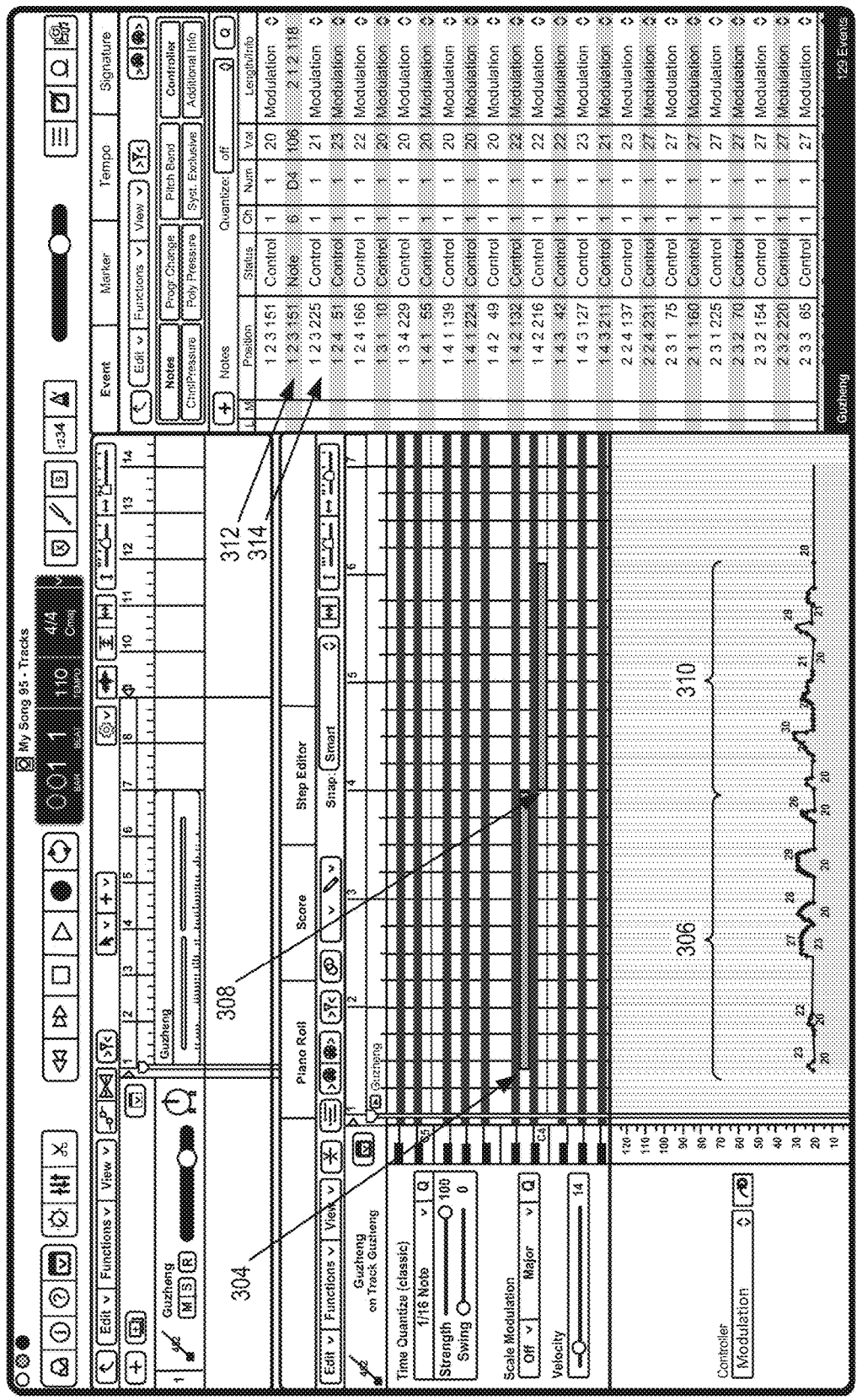
FIG. 3 is a simplified block diagram illustrating an example user interface for a virtual instrument (e.g., a Guzheng) that depicts a number of pressure measurements, according to at least one embodiment.

FIG. 3 is a simplified block diagram illustrating an example user interface 300 associated with a virtual instrument (e.g., a Guzheng) that depicts information related to a number of touch inputs, according to at least one embodiment. The user interface 300 may be utilized to visually inspect various aspect of previously received touch input. By way of example, the user interface 300 may provide data regarding the touch input received during the dragging action discussed above in connection with FIG. 2.

In some embodiments, the user interface 300 may depict pressure measurements 302 (e.g., amounts of pressure) of the touch input as provided over a time period (e.g., during at least some portion of the dragging action of FIG. 3 and as provided by the user). The user interface 300 may additionally depict musical notes that were provided via the speaker of the computing device based on a location associated with the touch input. For example, the musical note associated with a particular audio sample corresponding to a "D" may be sounded upon the user's initial touch input at location 204 of FIG. 2. The musical note sounded may be depicted at 304. As the note is sounded, the user's input may vary in pressure. The corresponding pressure measurements received while the user's input is directed at location 204 (or within the boundaries depicted at 206) of FIG. 2 may be displayed by pressure measurements 306.

At some point during dragging action described in FIG. 2, the user's touch input may cross over into the boundaries depicted at 212 and corresponding to the string 210. The string 210, as a non-limiting example, may be associated with a particular audio sample corresponding to a "C." The "C" note being sounded on the computing device is depicted at 308. As the "C" is sounded, the user's input may continue to vary in pressure. The corresponding pressure measurements received while the user's input is directed within the boundaries depicted at 212 and/or at locations along the string 210 may be depicted by pressure measurements 310.

Another portion of the user interface 300 may depict various events that are triggered based on the touch input. By way of example, the event data 312 may be displayed that displays location and pressure measurement details of touch input corresponding to the musical note depicted at 304. The event data 312 may include a position (e.g., "1 2 3 151") corresponding to the location 204 of FIG. 2. The event data 312 may further include a status (e.g., "Note") that indicates that a note was selected and a number indicating the particular note/audio sample (e.g., the "D" corresponding to number "D4") selected based on the touch input. The event data 312 may correspond to one of the pressure measurements 302. The event data 314 may correspond to an event that did not trigger selection of an audio sample. Such event data 314 may have been utilized to modify the volume of the audio sample being played at the time, or the event data 314 may have been used to track the current pressure being utilized at the computing device. The event data 312 and 314 (and any event data depicted in FIG. 3) may each correspond to a single touch input that is associated with a location and/or a pressure measurement.

Figure 4:
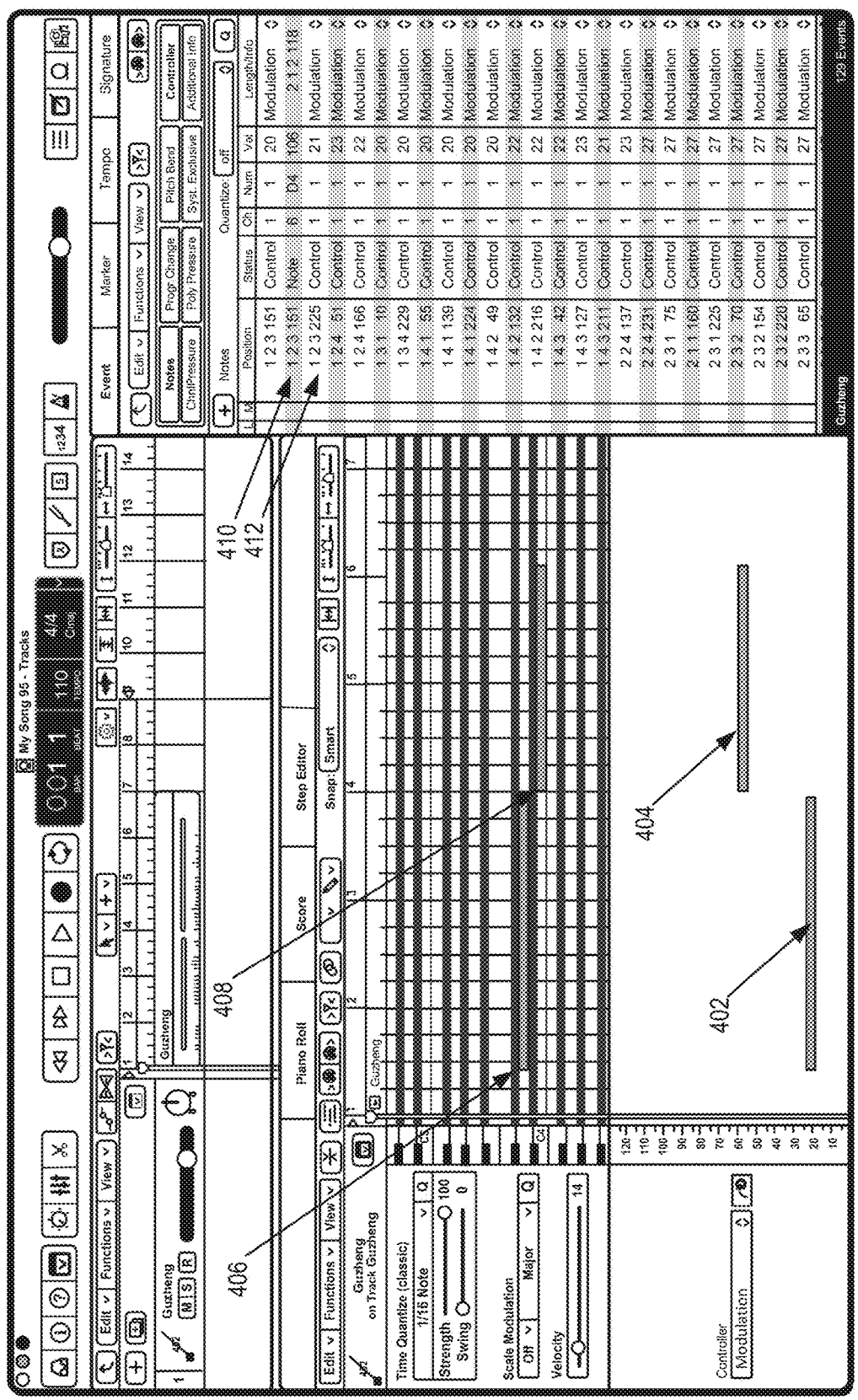
FIG. 4 is a simplified block diagram illustrating another example user interface for a virtual instrument (e.g., a Guzheng) that depicts a number of pressure measurements, according to at least one embodiment.

FIG. 4 is a simplified block diagram illustrating another example user interface 400 associated with a virtual instrument (e.g., a Guzheng) that depicts information related to a number of touch inputs, according to at least one embodiment. The user interface 400 may be utilized to visually inspect various aspect of previously received touch input. By way of example, the user interface 400 may provide data regarding the touch input received during the dragging action discussed above in connection with FIG. 2.

In some embodiments, the user interface 400 may depict pressure measurement 402 and pressure measurement 404, corresponding to two pressure measurements of the touch input as provided over a time period (e.g., during at least some portion of the dragging action of FIG. 3 and as provided by the user). The user interface 400 may additionally depict musical notes that were provided via the speaker of the computing device based on a location associated with the touch input. Continuing with the dragging example discussed above with respect to FIGS. 2 and 3, a "D" and a "C" may be played as the user drags her finger across corresponding strings/areas of FIG. 2. The presented/sounded "D" may be depicted at 406 and the "C" may be depicted at 408. As the notes are sounded, the user's input may vary in pressure. The corresponding pressure measurements received while the user's input is directed at location 204 (or within the boundaries depicted at 206) of FIG. 2 may be displayed by pressure measurements 306.

Another portion of the user interface 400 may depict various events that are triggered based on the touch input. By way of example, the event data 410 may be displayed that displays location and pressure measurement details of touch input corresponding to the musical note depicted at 406. The event data 410 may include a position (e.g., "1 2 3 151") corresponding to the location 204 of FIG. 2. The event data 410 may further include a status (e.g., "Note") that indicates that a note was selected and a number indicating the particular note/audio sample (e.g., the "D" corresponding to number "D4") selected based on the touch input. The event data 410 may correspond to one of the pressure measurements 302. The event data 412 may correspond to an event that did not trigger selection of an audio sample. Such event data 412 may have been utilized to modify the volume of the audio sample being played at the time, or the event data 412 may have been used to track the current pressure being utilized at the computing device. The event data 410 and 412 (and any event data depicted in FIG. 3) may each correspond to a single touch input that is associated with a location and/or a pressure measurement.

FIG. 4 is intended to provide an example in which a single pressure measurement is utilized to provide audio output corresponding to a note. Although the various event data depicted in FIG. 4 is displayed, the pressure measurement 402 may be the only pressure measurement to determine the volume of the note depicted at 402. Thus, as touch input is received, the location may be processed to determine if a new audio sample (corresponding to a new note) is to be selected. If the location of the touch input does not indicate a change in the selected audio sample, the new pressure measurement may be utilized to track a current pressure, or to provide event data within user interface 400. In some embodiments, additional processing of the new pressure measurement with respect to varying the volume of the audio sample being presented may not be performed. Similarly, pressure measurement 404 may be utilized to determine the volume of the audio sample provided, but additional pressure measurements may be utilized for tracking purposes, and processing directed to volume variation based on the additional pressure measurements may not occur.

Figure 5:
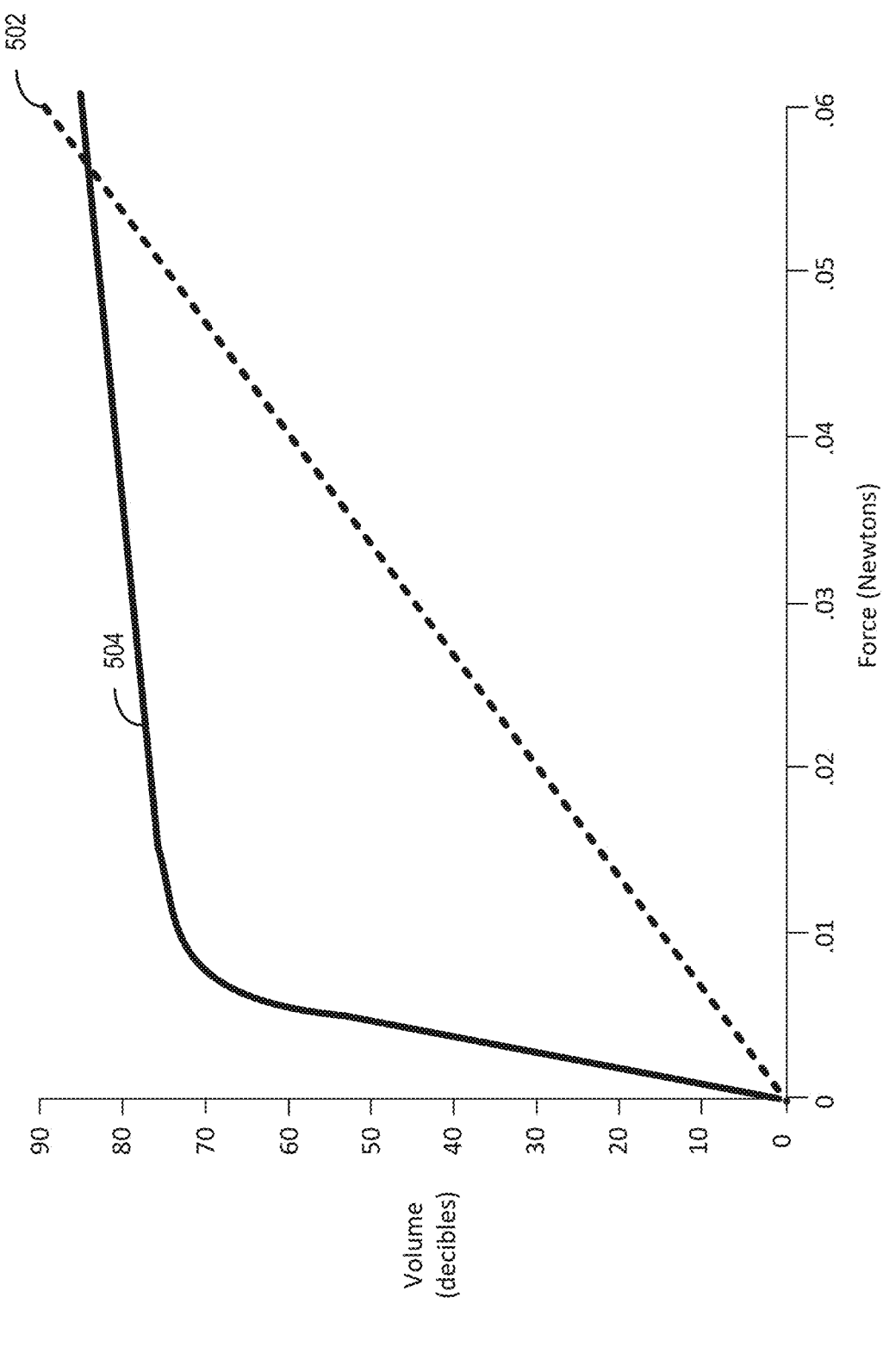
FIG. 5 is a simplified graph illustrating an example relationship between amounts of pressure associated with touch input and volumes of provided audio output, according to at least one embodiment.

FIG. 5 is a simplified graph 500 illustrating an example relationship between amounts of pressure associated with touch input and volumes of provided audio output, according to at least one embodiment. In some embodiments, pressure measurements may be received as raw values. The raw values may be converted to any suitable unit of force. A volume (e.g., in decibels or any suitable measurement of loudness) may be associated, or otherwise determined, based on the converted force. The line 502 may indicate various units of force corresponding to converted raw pressure measurements values. As the force of the pressure increases, the volume may increase as depicted by line 504. That is, the volume utilized to provide the audio output corresponding to a touch input may be vary in a non-linear manner as depicted in graph 500. Accordingly, relatively small amounts of pressure may cause relatively large increases in volume. As the force associated with the pressure increases, the corresponding volume may be less affected. The graph 500 is intended to depict one possible relationship between an amount of pressure (e.g., the force) of the touch input and the corresponding volume utilized to provide audio output.

Figure 6:
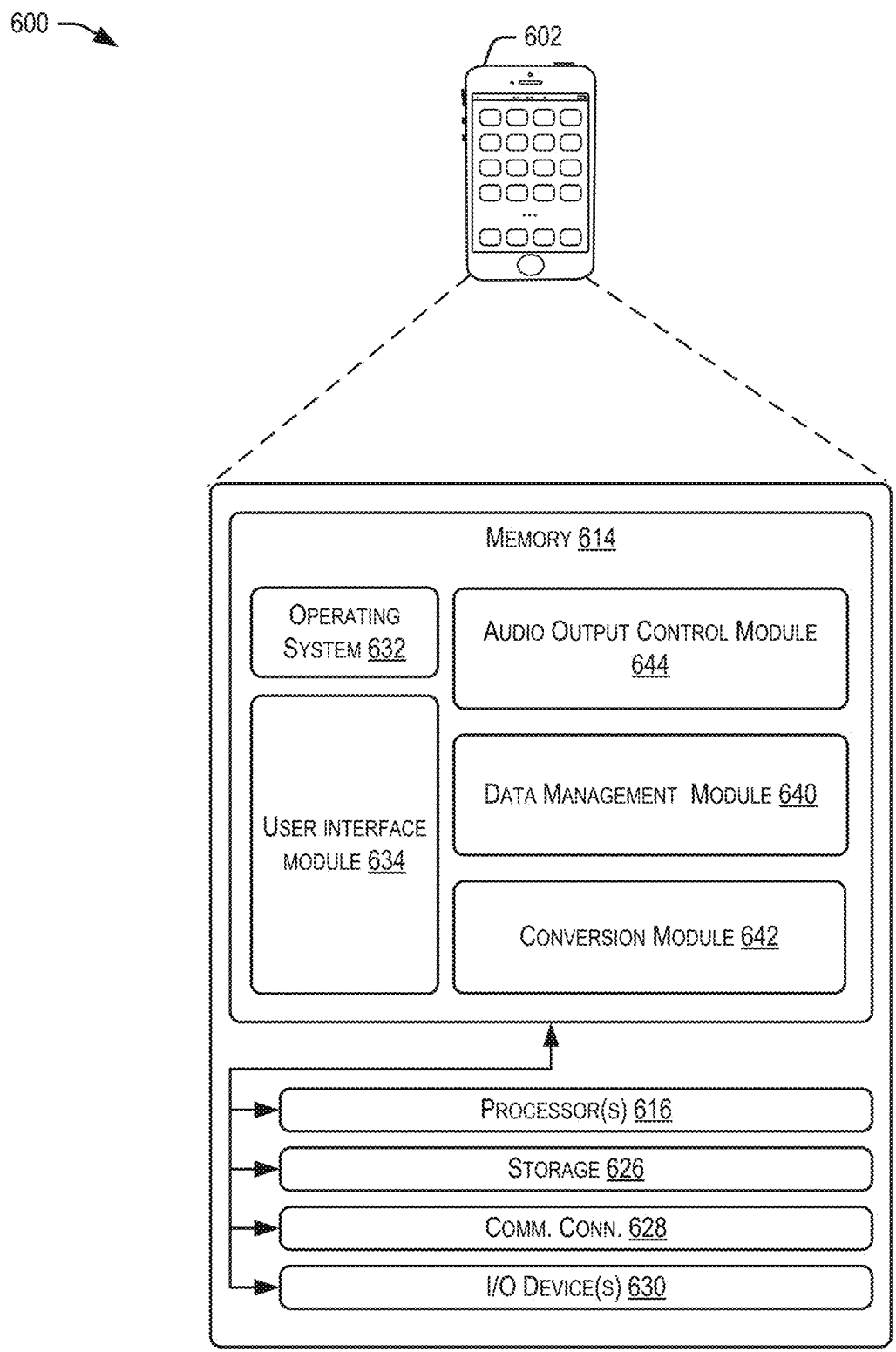
FIG. 6 is a simplified block diagram illustrating an example architecture for implementing a user interface and user interface elements for interacting with a virtual instrument as described herein, according to at least one embodiment.

FIG. 6 is a simplified block diagram illustrating an example architecture 600 for implementing a user interface (e.g., the user interface 200 of FIG. 2, the user interface 300 of FIG. 3, and/or the user interface 400 of FIG. 4) as described herein, according to at least one embodiment. In some examples, a computing device 602 (an example of the computing device 106 of FIG. 1), having the example architecture 600, may be configured to present a user interface (e.g., user interfaces 200, 300, 400, and the like).

The computing device 602 may be configured to execute or otherwise manage applications or instructions for presenting user interfaces/interface elements such as, but not limited to, a user interface (e.g., the user interface 200) for playing one or more virtual instruments. The computing device 602 may collect receive inputs (e.g., utilizing the I/O device(s) 630 such as a touch screen) from a user at the user interface, determine which audio samples to play in order to simulate playing the instrument, and then present audio output corresponding to the audio samples utilizing the I/O device(s) 630 (e.g., a speaker of the computing device 602). The computing device 602 may be configured to modify audio samples according to the received inputs prior to presenting them as audio output.

The computing device 602 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like.

In one illustrative configuration, the computing device 602 may include at least one memory 614 and one or more processing units (or processor(s)) 616. The processor(s) 616 may be implemented as appropriate in hardware, computer-executable instructions, or combinations thereof. Computer-executable instruction or firmware implementations of the processor(s) 616 may include computer-executable or machine-executable instructions written in any suitable programming language to perform the various functions described.

The memory 614 may store program instructions that are loadable and executable on the processor(s) 616, as well as data generated during the execution of these programs. Depending on the configuration and type of the computing device 602, the memory 614 may be volatile (such as random access memory (RAM)) and/or non-volatile (such as read-only memory (ROM), flash memory, etc.). The computing device 602 may also include additional removable storage and/or non-removable storage 626 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 614 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 614 and the additional storage 626, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 614 and the additional storage 626 are both examples of non-transitory computer storage media. Additional types of computer storage media that may be present in the computing device 802 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the computing device 602. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing device 602 may also contain communications connection(s) 628 that allow the computing device 602 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The computing device 602 may also include I/O device(s) 630, such as a touch input device, a keyboard, a mouse, a pen, a voice input device, a display, a speaker, a printer, etc.

Turning to the contents of the memory 614 in more detail, the memory 614 may include an operating system 632 and/or one or more application programs or services for implementing the features disclosed herein including a user interface module 634, a data management module 640, a conversion module 642, and an audio output control module 644. The memory 614 may also be configured to store one or more audio samples to be used to produce audio output. In this way, the computing device 602 can perform all of the operations described herein, including implementing an entire virtual instrument application, without connection to any other computing devices or networks. For example, the virtual instrument application can be executed locally with locally stored samples.

In some examples, the user interface module 634 may be configured to manage the user interface of the computing device 602. For example, the user interface module 634 may present the user interfaces 200, 300, and/or 400, or any suitable user interface for interacting with a virtual instrument or displaying data associated with such interactions. Additionally, in some examples, the user interface module 634 may be configured to receive and process user input (e.g., touch input) corresponding to interactions with the virtual instruments. For example, a user may tap a virtual string (or locations associated with a virtual string) within a user interface associated with a virtual instrument (e.g., user interface 200) to cause the computing device 602 to receive information corresponding to the touch input. The information may include any suitable data such as the touch input data (e.g., the event data discussed in FIGS. 3 and 4 or other suitable touch input including a location and/or a pressure measurement).

In some embodiments, the user interface module 634 may be configured to provide received touch input data to the data management module 640. The data management module 640 may be configured to store at least some portion of the touch input data within the memory 614. By way of example, the data management module 640 may be configured to store pressure measurements (e.g., in raw values, in converted units, etc.) associated with the received touch input. The data management module 640 may be configured to update a current pressure measurement corresponding to a pressure measurement that was last received.

In some embodiments, the conversion module 642 may be configured to convert raw pressure measurement values to a converted value according to a previously determined algorithm and/or mapping. In one example, a mapping may be maintained by the conversion module 642. The mapping may map raw pressure measurement values to converted pressure measurement values. Upon receipt of a raw value (e.g., as triggered by any suitable module discussed in connection with the computing device 602), the conversion module 642 may be configured to return a converted pressure measurement value corresponding to a raw pressure measurement value provided. In some embodiments, the conversion module 642 may be configured to convert raw pressure measurement values according to a predetermined algorithm.

In some embodiments, the audio output control module 644 may be configured to receive touch input data (e.g., from the user interface module 634) and/or obtain a current pressure measurement from the data management module 640, or from another suitable storage location. The audio output control module 644 may be configured to access a database (e.g., the storage 104 of FIG. 1) of stored audio samples. Based on received touch input data indicating a location within the user interface provided by the user interface module 634, the audio output control module 644 may be configured to identify a particular audio sample of the stored audio samples. By way of example, the audio output control module 644 may be configured to identify that the location indicated in the touch input corresponds to a particular string, the particular string being associated with a particular audio sample.

In some embodiments, the audio output control module 644 may be configured to determine a pressure measurement corresponding to received touch input. For example, the audio output control module 644 may provide a raw value provided in the touch input to the conversion module 642 in order for the raw value to be converted. In some examples, the audio output control module 644 may access a previously stored raw value (e.g., as stored by the data management module 640) and provide the raw value to the conversion module 642. The audio output control module 644 may be configured to receive converted pressure measurement values representing the touch input from the conversion module 642.

Once a converted pressure measurement value is obtained, the audio output control module 644 may be configured to determine a volume associated with the converted pressure measurement and compare it to a volume associated with the selected audio sample. If the volumes do not match (e.g., within a threshold amount), the audio output control module 644 may be configured to modify and/or present the audio sample at the computing device 602 (e.g., via the I/O Device(s) 630 such as a speaker) according to the volume associated with the converted pressure measurement.

In at least one embodiment, the audio output control module 644 may be configured to determine that the location included in received touch input does not indicate a change in the selected audio sample. In these cases, the audio output control module 644 may refrain from requesting a conversion of the raw pressure measurement values. In some embodiments, the raw pressure measurement values may still be stored by the data management module 640 even though conversion and/or further processing is not performed. Thus, the audio output control module 644 may be configured to determine a volume corresponding to the pressure measurement value only when the location of the touch input indicates a change in the which audio sample is selected.

Figure 7:
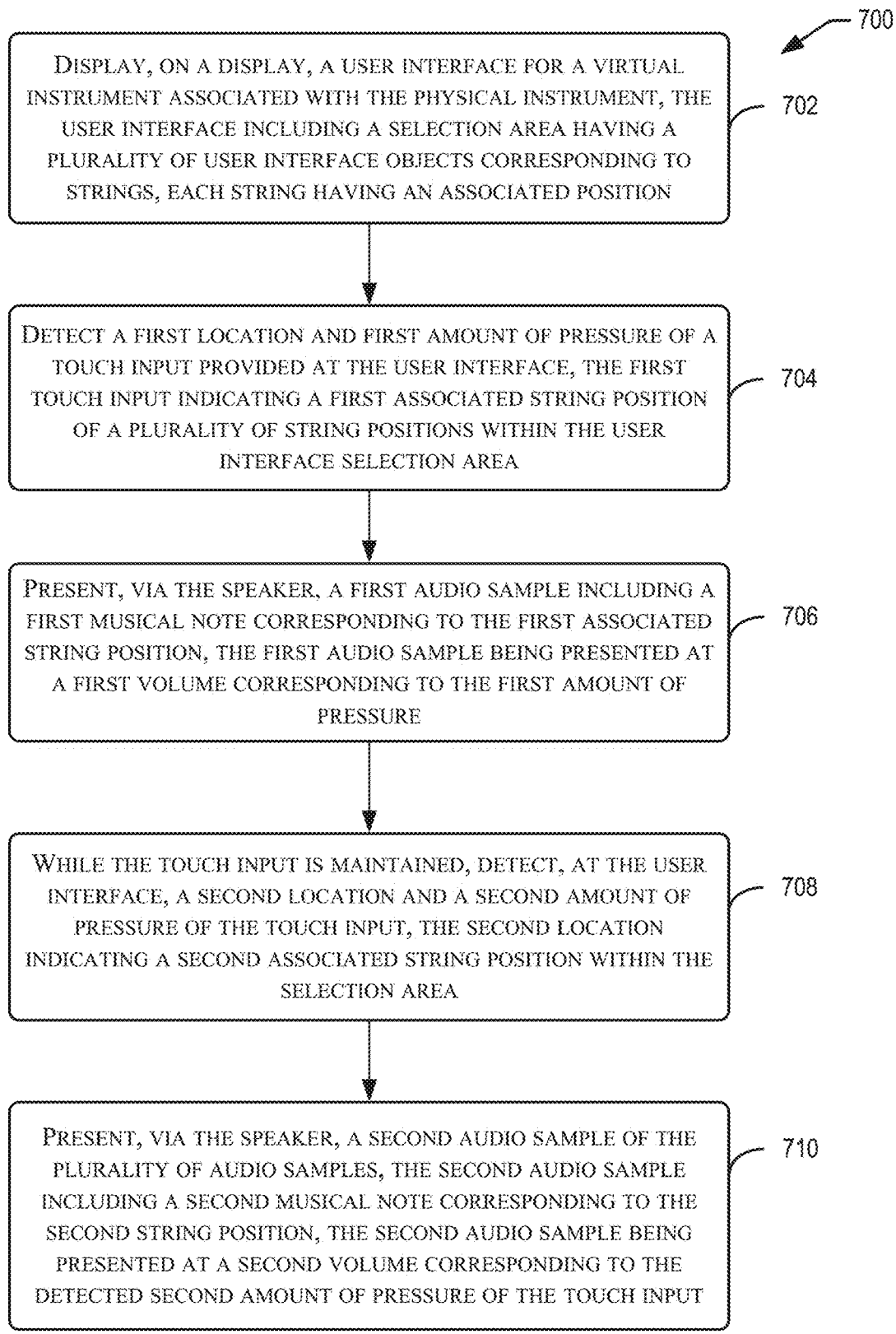
FIG. 7 is a simplified flow diagram illustrating an example process for providing audio output corresponding to touch input provided at a user interface for a virtual instrument as described herein, according to at least one example.

FIG. 7 is a simplified flow diagram illustrating an example process 700 for providing audio output corresponding to touch input provided at a user interface for a virtual instrument as described herein, according to at least one example. The process 700 illustrates as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the process 700.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 8:
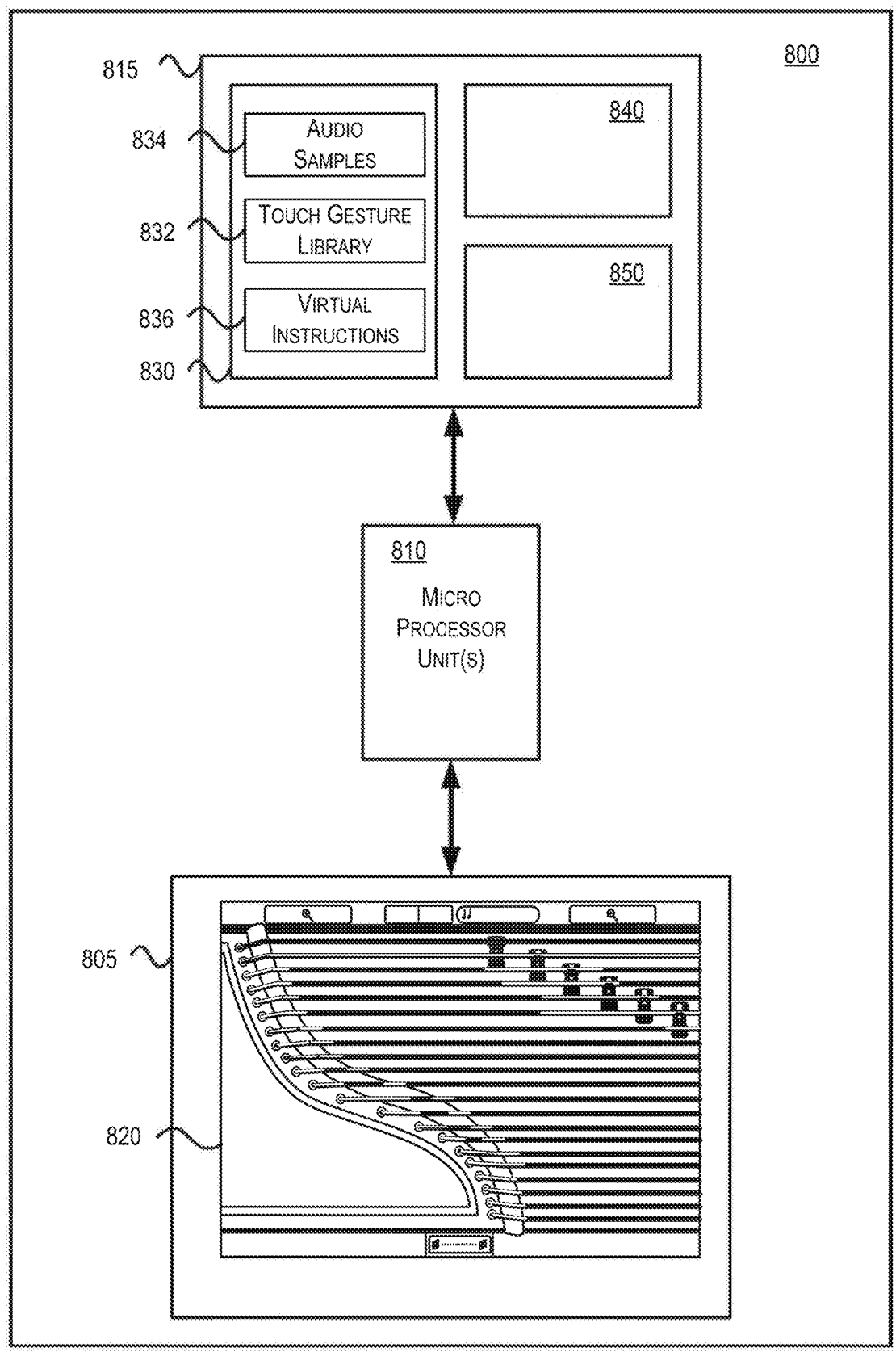
FIG. 8 is a simplified block diagram illustrating an example of a musical performance system that can enable a user to compose and create music with a number of virtual instruments on a music application as described herein, according to at least one example.

In some examples, the process 700 may be performed by the computing device 802 of FIG. 8 (e.g., utilizing at least the user interface module 634 and the configuration control module 636). In some examples, the computing device (e.g., the computing device 602, an example of the computing device 106 of FIG. 1) may comprise a memory configured to store computer-executable instructions, a speaker, and a processor in communication with the memory and the speaker, the processor configured to execute the computer-executable instructions. The process 700 may begin at 702 where a user interface (e.g., the user interface 200) for a virtual instrument (e.g., a Guzheng, a Koto, etc.) is displayed (e.g., by the user interface module 634 on a display of the computing device 602). In some embodiments, the user interface may include a selection area having a plurality of user interface objects corresponding to strings. In some embodiments, each string may have an associated position (e.g., a location or defined boundary corresponding to the string).

At 702, a user interface for a virtual instrument associated with the physical instrument (e.g., the user interface 200 of FIG. 2) may be displayed (e.g., via a display of the computing device 602 of FIG. 6 by, for example, the user interface module 634 of FIG. 6). In some embodiments, the user interface may include a selection area having a plurality of user interface objects corresponding to strings (e.g., the strings 204 and 210 for example). Each string may be associated with a position (e.g., a location or an area such as the area defined by the boundaries 206 and 208 of FIG. 2).

At 704, a first location and first amount of pressure of a touch input may be provided at the user interface. In some embodiments, the first touch input may indicate a first associated string position of a plurality of string positions within the user interface selection area. By way of example, touch input may be provided at the location 204 of FIG. 2. The touch input may include data identifying the location 204 as well as an amount of pressure (e.g., a pressure measurement) utilized to provide the touch input.

At 706, a first audio sample including a first musical note corresponding to the first associated string position may be provided at a speaker of the computing device 602, the first audio sample may be presented at a first volume corresponding to the first amount of pressure. The first audio sample may be selected from a plurality of audio samples that have been previously recorded and associated with various string positions.

At 708, while the touch input is maintained, a second location and a second amount of pressure of the touch input may be detected at the user interface. In some embodiments, the second location may indicate a second associated string position within the selection area.

At 710, a second audio sample may be presented via the speaker. In some embodiments, the second audio sample may include a second musical note corresponding to the second string position. Accordingly to some embodiments, the second audio sample may be presented at a second volume corresponding to the detected second amount of pressure of the touch input.

FIG. 8 illustrates an example of a musical performance system that can enable a user to compose and create music with a number of virtual instruments on a music application, according to an embodiment of the disclosure. Musical performance system 800 can include multiple subsystems such as a display 805, one or more processing units 810, and a storage subsystem 815. One or more communication paths can be provided to enable one or more of the subsystems to communicate with and exchange data with one another. The various subsystems in FIG. 8 can be implemented in software, in hardware, or combinations thereof. In some embodiments, the software can be stored on a transitory or non-transitory computer readable storage medium and can be executed by one or more processing units.

It should be appreciated that musical performance system 800 as shown in FIG. 8 can include more or fewer components than those shown in FIG. 8, can combine two or more components, or can have a different configuration or arrangement of components. In some embodiments, musical performance system 800 can be a part of a portable computing device, such as a tablet computer, a mobile telephone, a smart phone, a desktop computer, a laptop computer, a kiosk, etc.

Display 805 in some embodiments can provide an interface that allows a user to interact with musical performance system 800. Display 805 can be a monitor or a screen in some embodiments. Through the interface, the user can view and interact with a GUI 820 of a musical performance system 800. In some embodiments, display 805 can include a touch-sensitive interface (also sometimes referred to as a touch screen) that can both display information to the user and receive inputs from the user. Processing unit(s) 810 can include one or more processors that each have one or more cores. In some embodiments, processing unites) 810 can execute instructions stored in storage subsystem 815. System 800 may also include other types of user input and output mechanisms such as allowing a user to provide an input based at least in part on received accelerometer or gyroscope sensor readings (internal to musical performance system 800) or provide output such as haptic output based at least in part on a desired musical characteristic.

Storage subsystem 815 can include various memory units such as a system memory 830, a read-only memory (ROM) 840, and a permanent storage device 850. The system memory can be a read-and-write memory device or a volatile read-and-write memory, such as dynamic random access memory. The system memory can store some or all of the instructions and data that the processor needs at runtime. The ROM can store static data and instructions that are needed by processing unites) 810 and other modules of system 800. The permanent storage device can be a read-and-write memory device. Some embodiments of the disclosure can use a mass-storage device (such as a magnetic or optical disk or flash memory) as a permanent storage device. Other embodiments can use a removable storage device (e.g., a floppy disk, a flash drive) as a permanent storage device.

Storage subsystem 815 can store a touch gesture library that includes a number of system recognizable touch gestures 832 on the GUI 1120, MIDI-controlled audio samples 834 for storing data relating to music played on the virtual instruments, and virtual instrument data 836 for storing information about each virtual instrument. Further detail regarding system architecture and auxiliary components thereof are not discussed in detail so as not to obfuscate the focus on the disclosure and would be understood by those of ordinary skill in the art.

What is claimed is:

1. A method, comprising:
   obtaining a plurality of audio samples corresponding to recordings of musical notes played by a physical instrument;
   displaying, on a display screen of an electronic device, a user interface for a virtual instrument associated with the physical instrument, the user interface including a selection area having a plurality of user interface objects corresponding to a plurality of strings, each string of the plurality of strings having an associated position;
   detecting, on the display screen, a first location and a first amount of pressure of a touch input, the first location of the touch input indicating a first associated string position of a plurality of string positions within the selection area;

presenting, via a speaker of the electronic device, a first audio sample of the plurality of audio samples, the first audio sample including a first musical note corresponding to the first associated string position, the first audio sample being presented at a first volume corresponding to the first amount of pressure;

while the touch input is maintained, receiving a subsequent touch input update to the touch input, the subsequent touch input indicating a subsequent location;

maintaining the first volume of the first audio sample based at least in part on determining that the subsequent location of the subsequent touch input is within an area that includes locations within a threshold distance of the first associated string position;

while the touch input is maintained, detecting, on the display screen, a second location and a second amount of pressure of the touch input, the second location indicating a second associated string position within the selection area; and presenting, via the speaker of the electronic device, a second audio sample of the plurality of audio samples, the second audio sample including a second musical note corresponding to the second associated string position, the second audio sample being presented at a second volume corresponding to the second amount of pressure of the touch input.

2. The method of claim 1, wherein the physical instrument comprises a Guzheng, a Koto, or a Harp, and the virtual instrument correspondingly simulates the Guzheng, the Koto, or the Harp.

3. The method of claim 1, further comprising:
detecting that the touch input at the first location has been maintained for a period of time over a threshold; and
triggering a playing mode based at least in part on determining that the touch input has been maintained for the period of time over the threshold.

4. The method of claim 3, further comprising:
detecting a plurality of pressure measurements over time while the touch input is maintained; and
updating a current pressure amount based on the plurality of pressure measurements.

5. The method of claim 4, further comprising:
converting the current pressure amount from a raw value to a converted value associated with the virtual instrument based at least in part on the detecting the second location indicating the second associated string position, the second associated string position being different from the first associated string position.

6. The method of claim 1, wherein the subsequent touch input updates are received after the first amount of pressure of the touch input is detected and prior to detecting the second amount of pressure of the touch input at the second location indicating the second associated string position.

7. The method of claim 6, further comprises updating a raw pressure value based at least in part on the subsequent touch input update.

8. A system, comprising:
a memory configured to store computer-executable instructions;
a display;
a speaker; and
a processor in communication with the memory, the display, and the speaker, the processor configured to execute the computer-executable instructions to at least:
display, on the display, a user interface for a virtual instrument associated with a physical instrument, the user interface including a selection area having a plurality of user interface objects corresponding to a plurality of strings, each of the plurality of strings having an associated position;
detect a first location and first amount of pressure of a touch input provided at the user interface, the first location of the touch input indicating a first associated string position of a plurality of string positions within the selection area;
present, via the speaker, a first audio sample including a first musical note corresponding to the first associated string position, the first audio sample being presented at a first volume corresponding to the first amount of pressure;
while the touch input is maintained, receive a subsequent touch input update to the touch input, the subsequent touch input update indicating a subsequent location;
maintain the first volume of the first audio sample based at least in part on determining that the subsequent location is within an area that includes locations within a threshold distance of the first associated string position;
while the touch input is maintained, detect, at the user interface, a second location and a second amount of pressure of the touch input, the second location indicating a second associated string position within the selection area; and
present, via the speaker, a second audio sample, the second audio sample including a second musical note corresponding to the second associated string position, the second audio sample being presented at a second volume corresponding to the second amount of pressure of the touch input.

9. The system of claim 8, wherein the first musical note and the second musical note correspond to particular note frequencies of a plurality of note frequencies that are playable by the virtual instrument.

10. The system of claim 8, wherein the processor is further configured to execute the computer-executable instructions to at least discard the subsequent touch input update based at least in part on determining that the subsequent touch input update includes the subsequent location associated with the first associated string position.

11. The system of claim 10, wherein the processor is further configured to execute the computer-executable instructions to at least:
detect, by the processor, that the touch input has been maintained for a time period over a threshold, wherein the subsequent touch input update is discarded based at least in part on detecting that the touch input has been maintained for the time period over the threshold.

12. The system of claim 8, wherein the touch input simulates a glissando playing technique.

13. A non-transitory computer-readable storage medium having stored thereon computer-executable instructions that, when executed by a processor, cause the processor to perform operations comprising:
displaying a user interface for a virtual instrument associated with a physical instrument, the user interface including a selection area having a plurality of user interface objects corresponding to a plurality of strings, each string of the plurality of strings having an associated position;
detecting a first location and first amount of pressure of a touch input provided at the user interface, the first location indicating a first associated string position of a plurality of string positions within the selection area;

presenting, via a speaker, a first audio sample including a first musical note corresponding to the first associated string position, the first audio sample being presented at a first volume corresponding to the first amount of pressure; and while the touch input is maintained, receiving one or more touch input updates to the touch input, the one or more touch input updates indicating one or more subsequent locations;

maintaining the first volume of the first audio sample based at least in part on determining that the one or more subsequent locations of the one or more touch input updates are within an area that includes locations within a threshold distance of the first associated string position.

14. The non-transitory computer-readable storage medium of claim 13, having stored thereon additional computer-executable instructions that, when executed by a processor, cause the processor to perform operations comprising:

discarding amounts of pressure of the one or more touch input updates based at least in part on determining that the one or more subsequent locations of the one or more touch input updates are within the area that includes locations within the threshold distance of the first associated string position.

15. The non-transitory computer-readable storage medium of claim 13, having stored thereon additional computer-executable instructions that, when executed by a processor, cause the processor to perform operations comprising:

determining the first volume corresponding to the first amount of pressure based at least in part on:

receiving a raw pressure value corresponding to the touch input; and converting the raw pressure value according to a conversion algorithm associated with the virtual instrument.

16. The non-transitory computer-readable storage medium of claim 13, wherein the one or more touch input updates provide raw pressure values, and wherein the raw pressure values remain unconverted based at least in part on the determining that the one or more subsequent locations of the one or more touch input updates are within the area that includes locations within the threshold distance of the first associated string position.

17. The non-transitory computer-readable storage medium of claim 13, wherein the one or more touch input updates are received at the user interface based at least in part on a sliding motion performed by a user.

18. The non-transitory computer-readable storage medium of claim 17, wherein the sliding motion is received in an upward or downward direction.

19. The non-transitory computer-readable storage medium of claim 17, wherein the sliding motion traverses a plurality of strings of the virtual instrument.

* * * * *